United States Patent [19]

Sarnezki et al.

[11] Patent Number: 4,552,418
[45] Date of Patent: Nov. 12, 1985

[54] MOUNTING FOR DATA DISPLAY EQUIPMENT

[75] Inventors: Herbert Sarnezki, Munich; Klemens Hübner, Ottobrunn, both of Fed. Rep. of Germany

[73] Assignee: Siemens Aktiengesellschaft, Berlin and Munich, Fed. Rep. of Germany

[21] Appl. No.: 534,664

[22] Filed: Sep. 22, 1983

[30] Foreign Application Priority Data

Sep. 24, 1982 [DE] Fed. Rep. of Germany ....... 3235457

[51] Int. Cl.4 ............................................. H04N 5/64
[52] U.S. Cl. ................................... 312/242; 312/324; 312/325; 312/328
[58] Field of Search ................ 312/327, 328, 326, 21, 312/251, 42, 312, 323, 324, 325; 248/166, 460, 150; 108/144, 146

[56] References Cited

U.S. PATENT DOCUMENTS

| | | | |
|---|---|---|---|
| 348,706 | 9/1886 | Weiner | 248/460 |
| 3,244,450 | 4/1966 | Boutin | 248/466 |
| 3,534,935 | 10/1970 | Gunn | 108/146 |
| 4,371,077 | 2/1983 | Solitt et al. | 248/472 |
| 4,403,216 | 9/1983 | Yokol | 312/325 |

*Primary Examiner*—William E. Lyddane
*Assistant Examiner*—Joseph Falk
*Attorney, Agent, or Firm*—Herbert L. Lerner; Laurence A. Greenberg

[57] ABSTRACT

A mounting for display equipment, includes a lower part, an upper part, a picture screen disposed in the upper part, a connecting part rotatably supported about a vertical axis on the lower part, a support arm formed of first and second elongated hollow parts each having first and second ends, the second ends of the first and second parts being telescoped together, the first end of the first part being rotatably supported about a horizontal axis on the connecting part, the first end of the second part being rigidly connected to the upper part, at least one compensating element disposed in the support arm for pushing the first and second parts apart, the first part having at least one row of detent notches formed therein along the longitudinal direction of the support arm, at least one ratchet pawl rotatably supported about a horizontal axis in the second part, the ratchet pawl being engaged in one of the detent notches in a rest position thereof and being movable out of the detent notches in a disengaged position thereof, and a detent level engageable with the ratchet pawl and operable from outside the mounting for moving the ratchet pawl into the disengaged position.

12 Claims, 7 Drawing Figures

MOUNTING FOR DATA DISPLAY EQUIPMENT

The invention relates to a mounting for data display equipment, containing a picture screen with a plate-shaped flatly supported lower part or base plate, a box-shaped upper part or picture screen housing surrounding the picture screen, a connecting part rotatably supported about a vertical axis on the top of the base plate or turntable, a support arm formed of two elongated hollow parts, one part, the bottom part, of which is rotatably supported about a horizontal axis at one end thereof in the turntable, and the other part, the head part, of which is connected to the picture screen housing at one end thereof.

Such a device is described in German Published, Non-Prosecuted Application DE-OS No. 28 47 135.

The prior art picture screen support is constructed as follows: The picture screen unit proper rests on a two-piece support arm which in turn starts out as a solid base. The connection between the base and the support arm is constructed in such a way that the arm can be rotated about a vertical axis and can also be swung about a horizontal axis. In a tilting motion, the two parts of the support arm are also rotated relative to each other and more specifically in such a manner that the picture screen unit moving along retains its spacial orientation, i.e., is only subjected to a parallel translation. In addition, the picture screen unit can also be tilted relative to the support arm. Such a structure permits the display surface of the equipment to be brought into any desired position; however, it is rather expensive, in terms of the mechanical elements required, and it is prone to wear, especially because it requires three swivel joints which must be able to withstand considerable torques.

It is accordingly an object of the invention to provide a mounting for data display equipment, which overcomes the hereinafore-mentioned disadvantages of the heretofore-known devices of this general type and to do so in such a manner that fewer axes of rotation are required and yet all essential ergonomic requirements are met.

With the foregoing and other objects in view there is provided, in accordance with the invention, a mounting for display equipment, comprising a lower part, an upper part, a picture screen disposed in the upper part, a connecting part rotatably supported about a vertical axis on the lower part, a support arm formed of first and second elongated hollow parts each having first and second ends, the second ends of the first and second parts being telescoped together, the first end of the first part being rotatably supported about a horizontal axis on the connecting part, the first end of the second part being rigidly connected to the upper part, at least one compensating element disposed in the support arm for pushing the first and second parts apart, the first part having at least one row of detent notches formed therein along the longitudinal direction of the support arm, at least one ratchet pawl rotatably supported about a horizontal axis in the second part, the ratchet pawl being engaged in one of the detent notches in a rest position thereof and being movable out of the detent notches in a disengaged position thereof, and a detent lever engageable with the ratchet pawl and operable from outside the mounting for moving the ratchet pawl into the disengaged position.

The proposed mounting has a single joint, namely the rotary and swivel joint at the base of the support arm. This is sufficient because the joint permits arm movements through which the picture screen part which is fixed at the arm is turned or inclined sideways, and the height of the picture screen can be adjusted by changing the arm length. The length-variable support arm which, according to the invention, is formed of two telescoping hollow bodies which are pushed apart by a weight-compensating element and are locked by a ratchet mechanism, is stable and contains a relatively simple mechanism formed of easily assembled parts. Otherwise, the equipment can be brought into position conveniently because there is no delay caused by loosening and tightening of locking devices, and only small counter forces need be overcome in most directions of the motion.

In accordance with another feature of the invention, the lower part is a base plate supported in a level position, the upper part is a box-shaped housing surrounding the picture screen, the connecting part is a turntable supported on an upper surface of the base plate, the first part is a bottom part, and the second part is a head part, and there is provided a notch strip disposed in the bottom part and having the notches formed therein.

In accordance with a further feature of the invention, the head part is pushed over the bottom part.

In accordance with an added feature of the invention, the head part is integral with the picture screen housing.

In accordance with an additional feature of the invention, the at least one ratchet pawl is in the form of two ratchet pawls disposed at the same height relative to the support arm, each of the ratchet pawls being pivotable about a mutually parallel axis, each having a first end and each having a second end with extensions pointing away from each other, and a tension spring connecting the first ends of the ratchet pawls together, the detent lever being a rod parallel to the longitudinal axis of the support arm for pushing the first ends of the ratchet pawls apart in the disengaged position.

In accordance with again another feature of the invention, there is provided another spring, such as a leaf spring, supported in the support arm and connected to the detent lever for holding the ratchet pawls in the rest position.

In accordance with again a further feature of the invention, the support arm has a rectangular cross section with wide and narrow sides, and there are provided walls disposed in the support arm extended parallel to the narrow sides over at least part of the total length of the support arm defining an inner and two outer hollow spaces, and the at least one compensating element being in the form of two compensating elements each disposed in a respective one of the outer hollow spaces.

In accordance with again an added feature of the invention, the first and second parts include rear walls, the first end of the first part of the support arm includes a bottom transverse to the longitudinal axis of the support arm and continuous partitions forming the walls, the second part is pushed over the first part, the first end of the second part includes a partition transverse to the longitudinal axis of the support arm and ribs forming the walls extended from the partition and the rear wall of the second part, the rear wall of the first part being open and removed between the partitions of the first part, and the second part having a front wall in the form of two edge strips parallel to the longitudinal axis of the support arm.

In accordance with again an additional feature of the invention, there are provided detent notch strips each being disposed on a respective one of the partitions of the first part facing each other and each having the detent notches formed therein.

In accordance with yet another feature of the invention, there is provided an electric cable disposed in the inner hollow space of the support arm for unwinding.

In accordance with yet a further feature of the invention, the connecting part is a turntable, and there is provided a shaft rigidly connected to the turntable, a spring disposed on the shaft, a first detent disc rotatably disposed on the shaft and fixed to the first part of the support arm, and a second detent disc axially movable on the shaft into braking engagement with the first detent disc by the spring.

In accordance with yet an added feature of the invention, the spring is a compression spring, and there is provided another first and another second detent disc disposed on the shaft, the second detent discs facing each other with the spring therebetween pushing the second detent discs into the first discs.

In accordance with a concomitant feature of the invention, the shaft has a circular cross section with two opposite flattened sides.

Other features which are considered as characteristic for the invention are set forth in the appended claims.

Although the invention is illustrated and described herein as embodied in a mounting for data display equipment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
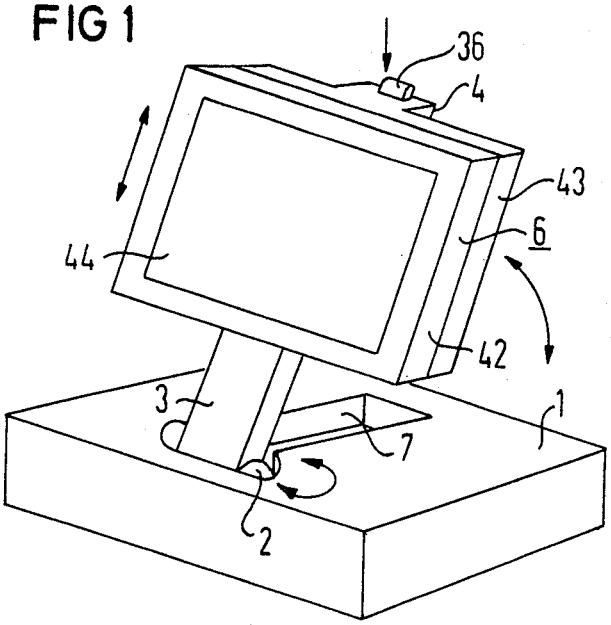
FIG. 1 is a diagrammatic perspective view of an embodiment of the device according to the invention.
Figure 2:
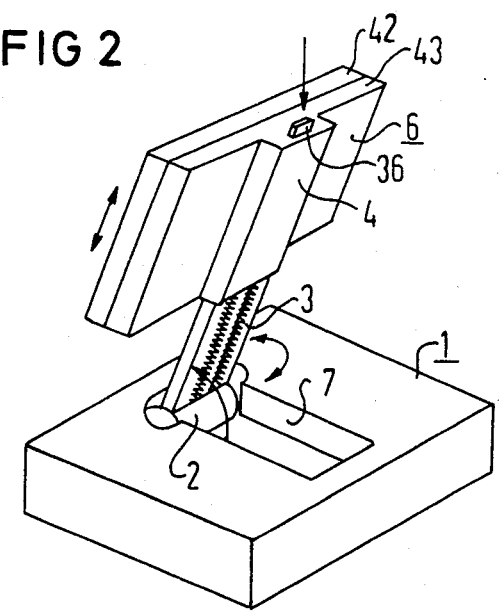
FIG. 2 is another perspective view of the embodiment of FIG. 1, as seen from another direction.

Referring now to the figures of the drawing in detail and first particularly to FIGS. 1 and 2 thereof, there is seen a mounting which supports a flat picture screen that can be used, for instance, for displaying color moving pictures and is described in the publication "Elektronik", Vol. 14 (1982), Page 79 along with its technical features. The mounting itself substantially includes the following parts: a base plate 1, a turntable or rotary seat 2, a support arm having a bottom part 3 and a head part 4 plugged together, and a picture screen housing 6.

The base plate is a flat box which contains some electric components, especially a power supply for the flat picture screen. The base plate rests on four non-illustrated non-skid rubber feet on a support, the feet being attached to a rectangular base surface. The upper surface of the box has a depression 7 formed therein which surrounds the turntable 2 and also receives the support arm if it is in the horizontal position and the two parts 3, 4 thereof are completely telescoped together.

Figure 3:
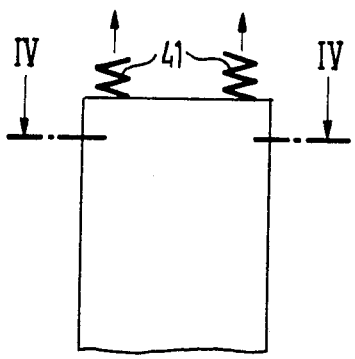
FIG. 3 is a fragmentary front-elevational view, partially broken-away of the bottom part of the support arm including the turntable and part of the base plate.

As will be seen from FIG. 3, the turntable includes a rotary disc 8, an adapter 9 with a U-shaped profile, and a shaft 11 which is brought through the two U-legs of the adapter in the horizontal direction. The disc 8 rests on the bottom of the depression 7 and is held by jaws 12 which are anchored in the bottom of the depression 7 and extend over an edge region of the rotary disc 8 in such a way that the turntable can rotate about a vertical axis. The disc, the adapter and the shaft are rigidly connected to each other. In order to ensure that the shaft 11 cannot rotate relative to the adapter, it has been given the cross section of a non-circular segment as shown at the right of FIG. 3, and it is mounted in suitably formed bearings.

Figure 4:
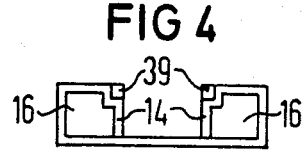
FIG. 4 is a cross-sectional view taken along the line IV—IV of FIG.3, in the direction of the arrows.

The bottom part 3 is a hollow body with a rectangular profile, as is best seen in FIGS. 3 and 4. Three chambers are formed in the bottom part by a bottom wall 13 and two partitions 14 which extend parallel to the narrow sides of the rectangular profile. The chambers are in the form of two outer chambers 16 as well as a middle chamber 17. All three chambers are open at the top, and the middle chamber also does not have a back. As shown in FIG. 3, the two small walls, which are the side walls of the bottom part 3, are extended beyond the bottom wall 13 and extend into the turntable adapter 9 which is open toward the top, while being rotatably supported about the shaft 11.

The entire apparatus is at equilibrium so that the turntable 2 does not have to be locked in any particular position. This is different than the rotary bearing system of the bottom part 3, onto which a torque is exerted in practically every position of the support arm. Accordingly, the shaft 11 carries two pairs of detent discs as well as a compression spring 18. Outer detent discs 19 of each pair of detent discs are rotatably secured about the shaft 11 and are disposed at the inner surfaces of the side walls of the bottom part. Meanwhile, respective inner detent discs 21 are disposed on the shaft 11 in such a way as to be non-rotatable but axially movable and are pushed by the compression spring 18 which is in the form of a coil spring in the present case. The discs 21 are pushed by the spring 18 against the respectively associated detent discs 19 and in the process the detent profile of the discs 21 engages the detent profile of the respective counter disc 19. The entire ratchet mechanism is constructed in such a way that the support arm can be swung from its horizontal position through 5° and maximally through 95° and that a small or relatively large resistance is exerted on an upwardly or downwardly directed swing.

Figure 6:
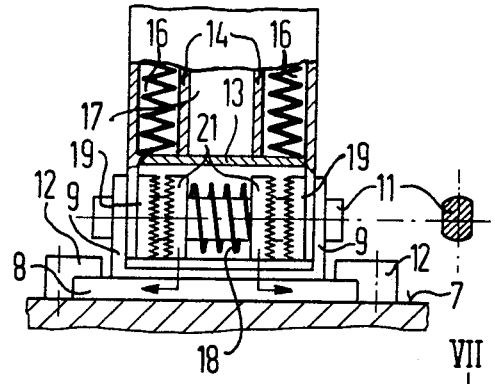
FIG. 6 is a fragmentary partially cross-sectional and partially front-elevational view of the head part of the support arm.
Figure 6:
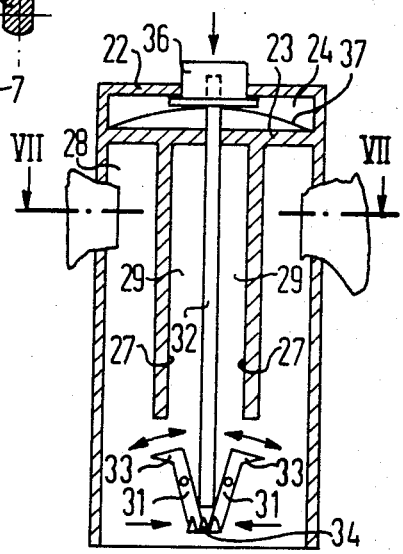
Figure 7:
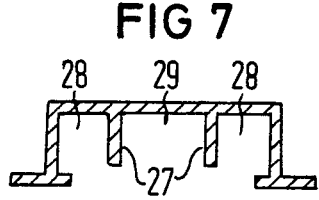
FIG. 7 is a cross-sectional view taken along the line VII—VII of FIG. 6, in the direction of the arrows.

In the embodiment as shown in FIG. 6, the head part of of the support arm is an integral component of the picture screen housing 6. The head part 4 is in the form of a ridge which projects from the rear of the housing and is pushed over the bottom part 3. Like the bottom part 3, the head part 4 is a hollow body of rectangular cross section. The upper end of the head part 4 is terminated by a cover plate 22, the lower end is open, and the interior is subdivided into two hollow spaces 24, 26 by a partition 23 which is placed near the cover wall 22 and is parallel thereto. The hollow space 26 in turn is divided by two ribs 27 into two outer spaces 28 and a middle space 29. Starting from the rear wall and the partition 23 of the head part, the two ribs 27 extend over at least two-thirds of the depth or height of the hollow space. The entire profile is constructed in such a way that the outer walls of the chambers 16 slide on the inner walls of the spaces 28 when both support arm parts are telescoped together.

Figure 5:
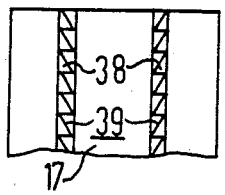
FIG. 5 is a fragmentary rear-elevational view of the bottom part of the support arm.

As is shown in FIG. 6, the head part 4 contains two ratchet pawls 31 as well as a detent lever or rod 32 in the interior thereof. The ratchet pawls are pivoted on the rear of the head part; the pivots are at the same height and extend in the horizontal direction. The two ratchet pawls are each provided with an outwardly-pointing point 33 at their upper ends and are pulled in at their lower ends by a common tension spring 34, so that they form a "V" as seen from the front. One end of the ratchet lever 32 which is parallel to the longitudinal axis of the head part extends into the V and its other end protrudes through the cover plate 22. This protruding lever end carries a pushbutton 36 which rests on a leaf spring 37 braced in the hollow space 24. In the rest position of the ratchet lever 32, the points of the ratchet 33 engaged in respective detent notches 38 of a detent notch strip 39. These strips are each placed in one of the partitions 14 of the bottom part 3, as seen in FIGS. 4 and 5.

If the pushbutton 36 is operated, the ratchet lever 32 is lowered and drives the lower ends of the two ratchet pawls 31 apart with the result that pawls 31 rotate about the axes shown and the ratchet pawl points 33 recede toward each other and release the detent notch strips 39. In this position, the head part 4 can be moved relative to the bottom part 3. If the support arm is at the correct length, the pushbutton is released; the ratchet pawls then return into their locking position. In order to permit the length adjustment to proceed without special effort, compression springs 41 are accomodated in the two support arm chambers which are each respectively formed by an outer chamber 16 and the associated outer space 28. These springs are selected in such a way that the support arm tends to expand if the pushbutton is pressed. If air pistons were used as the weight-compensating elements instead of the compression springs, the support arm would gradually become shorter and shorter if the detent ratchet was unlocked. In the embodiment shown, the entire length stroke of the arm is about 20 cm.

Similar to the base plate 1, the picture screen housing 6 is a flat box with rectangular base surfaces (front and rear). The front is substantially occupied by a display panel 44 of the picture screen unit, while the back contains the head part 4 as a rib-like projection extending parallel to the narrow sides of the base area.

In order to electrically connect the drive unit contained in the picture screen unit to the power supply located in the base plate, a flat cable is invisibly brought from the picture screen housing through the support arm, where it can unwind in the middle chamber of the bottom part, and the cable is plugged into the bottom plate.

We claim:

1. Mounting for display equipment, comprising a lower part in the form of a base plate having an upper surface and being supported in a level position, an upper part in the form of a box-shaped housing, a picture screen surrounded by said upper part, a connecting part in the form of a turntable rotatably supported about a vertical axis on said upper surface of said lower part, a support arm formed of a first elongated hollow bottom part and a second elongated hollow head part each having first and second ends, said second ends of said first and second parts being telescoped together, said first end of said first part being rotatably supported about a horizontal axis on said connecting part, said first end of said second part being rigidly connected to said upper part, at least one compensating element disposed in said support arm for pushing said first and second parts apart, a notch strip disposed in one of said first and second parts having at least one row of detent notches formed therein along the longitudinal direction of said support arm, at least one ratchet pawl rotatably supported about a horizontal axis in the other of said first and second parts, said ratchet pawl being engaged in one of said detent notches in a rest position thereof and being movable out of said detent notches in a disengaged position thereof, and a detent rod engageable with said ratchet pawl and operable from outside the mounting for moving said ratchet pawl into said disengaged position.

2. Mounting according to claim 1, wherein said head part is pushed over said bottom part.

3. Mounting according to claim 1, wherein said head part is integral with said picture screen housing.

4. Mounting according to claim 1, wherein said at least one ratchet pawl is in the form of two ratchet pawls disposed at the same height relative to said support arm, each of said ratchet pawls being pivotable about a mutually parallel axis, each having a first end and each having a second end with extensions pointing away from each other, and a tension spring connecting said first ends of said ratchet pawls together, said detent rod being parallel to the longitudinal axis of said support arm for pushing said first ends of said ratchet pawls apart in said disengaged position.

5. Mounting according to claim 4, including another spring supported in said support arm and connected to said detent rod for holding said ratchet pawls in said rest position.

6. Mounting according to claim 1, wherein said support arm has a rectangular cross section with wide and narrow sides, and including walls disposed in said support arm extended parallel to said narrow sides over at least part of the total length of said support arm defining an inner and two outer hollow spaces, and said at least one compensating element being in the form of two compensating elements each disposed in a respective one of said outer hollow spaces.

7. Mounting according to claim 6, wherein said first and second parts include rear walls, said first end of said first part of said support arm includes a bottom transverse to the longitudinal axis of said support arm and continuous partitions forming said walls, said second part is pushed over said first part, said first end of said second part includes a partition transverse to the longitudinal axis of said support arm and ribs forming said walls extended from said partition and said rear wall of said second part, said rear wall of said first part being open between said partitions of said first part, and said second art having a front wall in the form of two edge strips parallel to the longitudinal axis of said support arm.

8. Mounting according to claim 7, including detent notch strips each being disposed on a respective one of said partitions of said first part facing each other and each having said detent notches formed therein.

9. Mounting according to claim 6, including an electric cable disposed in said inner hollow space of said support arm for unwinding.

10. Mounting according to claim 1, wherein said connecting part is a turntable, and including a shaft rigidly connected to said turntable, a spring disposed on said shaft, a first detent disc rotatably disposed on said shaft and fixed to said first part of said support arm, and a second detent disc axially movable on said shaft into braking engagement with said first detent disc by said spring.

11. Mounting according to claim 10, wherein said spring is a compression spring, and including another first and another second detent disc disposed on said shaft, said second detent discs facing each other with said spring therebetween pushing said second detent discs into said first discs.

12. Mounting according to claim 10, wherein said shaft has non-circular cross section with two opposite flattened sides.

* * * * *